United States Patent [19]

Bunker et al.

[11] Patent Number: 5,001,107
[45] Date of Patent: Mar. 19, 1991

[54] METHOD FOR THE PREPARATION OF THALLIUM-CONTAINING SUPERCONDUCTING MATERIALS BY PRECIPITATION

[75] Inventors: Bruce C. Bunker; Diana L. Lamppa; James A. Voigt, all of Albuquerque, N. Mex.

[73] Assignee: The United States Department of Energy, Washington, D.C.

[21] Appl. No.: 388,429

[22] Filed: Aug. 2, 1989

[51] Int. Cl.$^5$ .................. C01F 11/02; C01G 3/02; H01L 39/12
[52] U.S. Cl. ................................. 505/1; 252/521; 423/111; 505/737; 505/738; 505/783
[58] Field of Search .................. 505/737, 738, 783, 1; 423/111; 252/521; 501/123

[56] References Cited

U.S. PATENT DOCUMENTS

| | | | |
|---|---|---|---|
| 4,192,814 | 3/1980 | Johnson | 423/111 |
| 4,418,051 | 11/1983 | Brown et al. | 423/592 |
| 4,438,080 | 3/1984 | McEuen et al. | 423/111 |
| 4,438,089 | 3/1984 | Byers | 423/111 |

FOREIGN PATENT DOCUMENTS 0303249 2/1989 European Pat. Off. .

OTHER PUBLICATIONS

*Grant & Hackh's Chemical Dictionary,* 5th Ed., 1987: McGraw-Hill Book Co., pp. 583–584.
Beyers, "Crystallography and Microstructure of Tl—Ca-Ba—Cu—O", *Appl. Phys. Lett.,* vol. 53(5), Aug. 1, 1988, pp. 432–434.
Haldar, "Bulk Superconductivity at 122K in Tl(Ba,-Ca)$_2$Ca$_3$Cu$_4$O$_{10.5+\delta}$", *Science,* vol. 241, 1988, pp. 1198–2000.
Pramanik, "Preparation of Superconducting Ceramic Oxides ...", *Rev. of Sol. State Sci.: Proceedings,* May 2–4, 1988, pp. 57–59.
Fujki, "Preparation of a High-T$_c$Y—Ba—Cu—O Superconductor ...", *Jap. Jnl. Appl. Phys.,* vol. 26(7), Jun. 1987, pp. L1159–L1160.
Ihara, "A New High-T$_c$TlBa$_2$Ca$_3$Cu$_4$O$_{11}$ Superconductor ...", *Nature,* vol. 334, Aug. 11, 1988, pp. 510–511.
Torardi, "Crystal Structure of Tl$_2$Ba$_2$Ca$_2$Cu$_3$O$_{10}$, a 125K ...", *Science,* vol. 246, Apr. 29, 1988, pp. 631–633.
Sugise, "Preparation of Tl$_2$Ba$_2$Ca$_2$Cu$_3$O$_y$ Thick Films ...", *Jap. Jnl. Appl. Phys.,* vol. 27(12), Dec. 1988, pp. L2314–L2316.
Parkin, "Tl$_1$Ca$_{n-1}$Ba$_2$Cu$_n$O$_{2n+3}$(n=1, 2, 3): A New Class ...", *Phys. Rev. Lett.,* vol. 61(6), Aug. 8, 1988, pp. 750–753.

*Primary Examiner*—Paul Lieberman
*Assistant Examiner*—John Boyd
*Attorney, Agent, or Firm*—Armand McMillan; James H. Chafin; William R. Moser

[57] ABSTRACT

This invention provides improved methods for the preparation of precursor powders that are used in the preparation of superconducting ceramic materials that contain thallium. A first solution that contains the hydrogen peroxide and metal cations, other than thallium, that will be part of the ceramic is quickly mixed with a second solution that contains precipitating anions and thallium (I) to form a precipitate which is dried to yield precursor powders. The precursor powders are calcined an sintered to produce superconducting materials that contain thallium.

7 Claims, No Drawings

METHOD FOR THE PREPARATION OF THALLIUM-CONTAINING SUPERCONDUCTING MATERIALS BY PRECIPITATION

The U.S. Government has rights in this invention pursuant to contract no. DE-AC04-76DP00789 between the U.S. Department of Energy and AT&T Technologies, Inc.

BACKGROUND OF THE INVENTION

1. Technical Field

The present invention is related generally to superconducting materials. More particularly, the present invention is related to new high temperature superconducting ceramic materials that contain thallium and to a process for the synthesis of said superconducting compositions.

2. State of the Art

Ceramic materials consist of sintered grains of metal oxide powders and, ideally, are highly dense and nonporous. Ceramic superconducting materials contain several constituent metal oxides and are produced by solid state reactions among the constituent oxides during high temperature sintering. The degree of sintering of the metal oxide powders is a function of the particle size, degree of agglomeration, and homogeneity of the mixture of the constituent metal oxide powders. Large size and agglomerated particles and inhomogeneous mixtures thereof result in a ceramic that is less sintered, inhomogeneous, porous, and brittle. Not only does the size of the metal oxide powder particles and homogeneity of the mixture of the powder particles affect the gross physical properties of the ceramic material, such as hardness and tensile strength, it affects the local chemical and electrical properties of such materials. Inhomogeneities in the ceramic that arise from incomplete mixing of the constituent metal oxide powders lead to unwanted phases and chemical gradients, which alter the conductive properties of the material. Ideally ceramic high temperature superconducting materials should be homogenous and non-porous.

High temperature superconducting ceramic materials are generally prepared by heating a ball-milled mixture of the powdered oxides of the component metal cations. This method of preparation, however has several drawbacks. The particles in the ball-milled mixed oxide powders are large and agglomerated and the ceramics produced therefrom are inhomogeneous (see, e.g., Morosin et al. (1988) Physica C vol. 152, pp. 413–23) and porous. Further, large size particle powders are not highly reactive so that calcining temperatures of greater than 800° C. are necessary to drive the solid state reactions. High temperature calcining promotes further growth in particle size and partial sintering among the constituent particles, which further contributes to the high degree of the porosity of the ceramics.

Precipitation of insoluble salts of the metal cations from solution has been used as a means to achieve a more homogeneous mixture of the constituent metal cations. Precipitation of powders from solution is designed to overcome some of the drawbacks inherent in the procedures in which metal oxide powders are mixed and has provided a means for eliminating problems that arise from inadequate mixing and agglomeration of the powders. In the Argonne precipitation method (Wang et al. Inorganic Chemistry vol. 26 pp. 1474–76 (1987)), which does not yield highly homogeneous mixtures, a solution of mixed oxides is titrated with base which, depending upon the respective solubilities as a function of pH of the hydroxides of the constituent metal cations, leads to successive precipitation of the metal hydroxides. Because the metals precipitate sequentially the powders are not homogeneous. For example, a solution of mixed oxides of yttrium, barium, and copper is titrated with hydroxide, which first precipitates copper hydroxide followed by yttrium hydroxide. Because the hydroxide salts of barium are highly soluble, potassium carbonate is then added to precipitate barium carbonate. Because of the successive precipitation of the insoluble metal salts, the powders produced by this method are inhomogeneous. In addition, the powders are highly contaminated with the precipitating counter ions, such as potassium and chloride.

In order to overcome the problems inherent in the prior art methods we have developed a precipitation method for preparing fine grained chemically homogenous powders that can be used to produce homogeneous dense superconducting ceramics. This process is described in Bunker et al., U.S. Pat. No. 4,839,339, which is herein incorporated in its entirety by reference thereto. The precipitation method of Bunker et al., supra., provides controlled precipitation of insoluble salts by instantaneously mixing at a controlled pH two or more solutions, which respectively contain highly soluble components. A first solution is prepared that contains highly soluble salts of the parent metal cations, such as yttrium, barium, and copper nitrates at concentrations such that the ratios thereof match the stoichiometric ratios of said metals in the superconducting ceramic material. A selected volume of the first solution is instantaneously mixed with a selected volume of a second solution, that contains highly soluble salts of pyrolyzable precipitating anions, such as hydroxide and carbonate. The pH of the resulting mixture is, thus, controlled because it is between the pH of both solutions and is selected such that the concentration of each of the dissolved metal cations remaining in the solution after the addition of the precipitating anion solution is three orders of magnitude lower than in the starting solution. In addition, the counter ions in both solutions are chosen so that they are thermally decomposed during high temperature processing. This precipitation method produces finely grained homogenous powders that can be calcined and sintered to produce highly dense homogenous superconducting ceramics. This procedure is, however, only applicable to metal cations whose salts are highly soluble in the first solution and insoluble when the first solution is mixed with a second solution. Some metals, such as thallium, do not fit this criterion.

Superconducting systems that contain thallium, such as the Tl—Ca—Ba—Cu—O system, are well-known (see e.g., Morosin et al., supra., Hazen et al. (1988) Phys. Rev. Lttrs. vol. 60, pp. 1657–1660, and Kwak et al. (1988) Physica C Vol. 156, pp. 103–108). Superconducting materials in the Tl—Ca—Ba—Cu—O system have been prepared by methods that include the mixed-oxide milling procedures, discussed above (see, also, Morosin et al. supra., Voigt et al. (1988) Met. Res. Soc. Symp. Proc. vol. 99, pp. 635–638, and Hazen et al., supra.), and by deposition and annealing of the constituent metals on singlecrystal substrates to produce films thereof (see, e.g., Kwak, supra.). The methods for preparing bulk ceramics, however, suffer from the drawbacks, discussed above, that result from inhomogeneous and agglomerated mixtures of the constituent metals or metal oxides. In addition, the constituent thallium oxides are unstable and volatile. For example, $Tl_2O_3$ decomposes at temperatures above 800° C., and is very volatile. These properties pose a problem because ceramic superconductors are processed at temperatures above 800° C. in order to drive the solid state reactions. Because of the volatility and instability of thallium oxides the annealing reactions can only be carried out for short times and excess thallium oxides must be added in order to drive the solid state reactions. It is, therefore, difficult to control the stoichiometry of the constituent metals in the final product. In addition, a multiplicity of undesired phases are formed (see, e.g., Hazen et al., supra.). The multiple phases are not only caused by the volatility of the thallium oxides but also by inhomogeneities and large size particles in the metal oxide powders or other starting material.

Although the general precipitation method of Bunker et al., supra., is useful for precipitating salts of cations of elements, such as calcium, barium, copper, and yttrium, which are highly soluble at low pH and insoluble at higher pH, this method cannot be used to prepare mixtures that contain cations, such as thallium in the +1 oxidation state, whose salts are highly soluble in aqueous solutions at all pH values. Almost all salts of thallium in the +1 oxidation state are highly soluble and do not precipitate at the pH ranges that precipitate other metal cation salts, such as the hydroxides or carbonates of barium, calcium, and copper. On the other hand salts of thallium in the +3 oxidation state are highly insoluble and cannot be dissolved in the first parent metal cation solution that contains soluble salts of the other metal cations. There is, thus, a need for an improved precipitation process for preparing powders for use in the preparation of highly dense homogenous superconducting materials that contain thallium, particularly for the preparation of homogeneous superconducting ceramics that contain thallium, calcium, barium, and copper.

SUMMARY OF THE INVENTION

It is one object of this invention to provide an improved method for producing homogenous finely grained precursor powders for the production of highly dense superconducting ceramic materials that contain oxides of thallium and other metals, said method comprising (a) preparing a first aqueous solution that comprises soluble salts of said other metals and hydrogen peroxide, wherein the amount of said hydrogen peroxide is in at least 5-fold, preferably a 10-fold, excess compared to the amount of thallium (I) cations in a second solution; (b) preparing said second solution, wherein said second solution comprises soluble salts of thallium (I) and decomposable or pyrolizable counter anions and precipitating anions; (c) instantaneously mixing said first and second solutions, whereupon thallium (I) cations are oxidized to thallium (III) cations, which, along with said other metal cations, precipitates out of solution as a salt of said precipitating anions; and, (d) collecting and drying the precipitate to produce said precursor powder.

It is another object of this invention to provide an improved method for preparing a precursor powder which can be successively, calcined and sintered to form a superconducting ceramic material having the formula $Tl_aCa_bBa_cCu_dO_x$, wherein a,b,c, and d are the desired stoichiometric ratios of each constituent metal in said superconducting ceramic material, and x is the stoichiometric ratio of oxygen, comprising: (a) preparing a first aqueous solution containing calcium cations, barium cations, copper cations, pyrolyzable or decomposable counter ions, and hydrogen peroxide, wherein the ratio of the concentrations of calcium to barium is b to c, the ratio of the concentrations of barium to copper is c to d and the amount of hydrogen peroxide is at least a five-fold excess, preferably ten-fold excess, of the amount of thallium (I) cations in a second aqueous solution; (b) preparing said second aqueous solution comprising thallium (I) cations, hydroxide and carbonate precipitating anions, and pyrolizable or decomposable counter ions, wherein said thallium (I) cations are at a concentration such that, upon mixing a selected quantity of the second solution with a selected quantity of said first solution, thallium metal cations will be present at a concentration in the mixture such that the ratio of thallium to calcium ions is about 2.5-fold greater than that desired in the final ceramic product; (c) instantaneously mixing said selected quantities of said solutions at a pH that is controlled at a pH selected from the group consisting of pH 9 to 11 to yield a precipitate comprising calcium, barium and copper at the desired stoichiometric ratio and thallium ions at least 1.5-fold, preferably 1.75-fold, greater than the desired stoichiometric ratio; and, (d) collecting said precipitate which consists of the thallium (III), barium; calcium, and copper cations, hydroxide and carbonate anions, and minor quantities of pyrolizable counter ions.

It is another object of this invention to provide homogeneous and dense ceramic superconducting materials that contain thallium comprising successively calcining and sintering the finely grained homogenous powders that contain thallium and that are produced by the methods disclosed herein.

It is another object of this invention to provide dense homogenous superconducting materials consisting of thallium, calcium, barium, copper and oxygen.

It is another object of this invention to provide dense homogenous superconducting material having the formulas $Tl_2CaBa_2Cu_2O_8$, $TlCa_2Ba_2Cu_3O_x$, $Tl_2Ca_2Ba_2Cu_3O_x$, and $TlCaBa_2Cu_2O_x$.

In accordance with this invention there is provided a method for preparing a precursor powder which can be successively calcined and sintered to form a superconducting ceramic material that contains oxides of thallium (III) and oxides of other metal cations at selected stoichiometric ratios said method comprising (a) preparing a first aqueous solution containing said other metal cations, pyrolyzable or decomposable counter anions, and hydrogen peroxide, wherein the ratios among the concentrations of said metal cations are the same as said selected stoichiometric ratios and the amount of hydrogen peroxide is at least a five-fold excess, preferably ten-fold excess, of the amount of thallium (I) cations in a second aqueous solution; (b) preparing a second aqueous solution comprising thallium (I) cations, precipitating anions, and counter ions wherein said thallium (I) cations are present at a concentration such that upon mixing a selected quantity of this second solution with a selected quantity of said first solution thallium metal cation will be present in the mixture at a concentration about a 2-fold to 4-fold, preferably a 2.5-fold, greater than that which would be equivalent to the selected stoichiometric ratio of thallium (III) in said ceramic; (c) instantaneously mixing said selected quantities of said first and second solutions whereby said mixture is at a pH that is within the range at which the precipitating anion salts of the metal cations of said first aqueous solution are insoluble in order to precipitate said salts and whereby thallium (I) is oxidized in the presence of hydrogen peroxide to thallium (III), which forms an insoluble salt with the precipitating anions, to yield a precipitate comprising said cations at said stoichiometric proportions; and (d) collecting the precipitate which consists of the desired cations, hydroxide, and carbonate anions, and minor quantities of pyrolizable or decomposable counter ions, and drying said precipitate to produce a homogeneous powder containing thallium at a ratio least 1.5-fold, preferably, 1.75-fold, greater than the desired stoichiometric ratio and said other metals at the desired stoichiometric ratios.

In accordance with this invention there is also provided a method for preparing a superconducting ceramic material that contains thallium and other metal cations at the desired stoichiometric ratio and also contains oxygen comprising successively calcining the precursor powder produced by the methods disclosed herein at temperatures of about 800° C. to about 900° C., pressing said powder into a pellet, and then sintering said pellet at about 800° C. to about 900° C. to produce a homogenous and dense superconducting ceramic.

This invention provides a significantly improved method for preparing precursor powders for the production of superconducting ceramic materials that contain thallium, particularly those that contain thallium, calcium, barium, and copper.

This invention also provides a significantly improved method for preparing superconducting materials comprised of thallium and particularly for preparing superconducting materials in the Tl—Ba—Ca—Cu—O system and also provides highly homogeneous and dense superconducting materials that contain thallium, particularly the Tl—Ba—Ca—Cu—O system superconducting materials.

DESCRIPTION OF THE PREFERRED EMBODIMENTS

Unless defined otherwise, all technical and scientific terms used herein have the same meaning as is commonly understood by one of ordinary skill in the art to which this invention belongs. Although methods and materials similar or equivalent to those described herein can be used in the practice of testing of the present invention, the preferred methods and materials are now described. All publications mentioned hereunder are incorporated by reference.

As used herein the term "superconductor" refers to a ceramic material that conducts electricity without any resistance below a certain critical temperature. As produced by the methods disclosed herein the superconducting ceramics consist of oxides of constituent metal cations and trace levels of impurities.

As used herein a constituent metal cation is an ionic species which is ultimately incorporated in the metal oxide powders from which the superconducting material is produced.

As used herein a counter ion is an ion that is part of the starting materials for the producing the ceramic superconducting material, but which does not, other than as a trace impurity, become part of the ceramic superconducting material.

As use herein a precipitating anion, such as hydroxide and carbonate, is a counter ion which forms an insoluble salt with the metal cations that will ultimately form the ceramic superconducting material. For practice of the invention disclosed herein it is preferable that said precipitating anions are decomposable or pyrolyzable so that upon calcining and sintering the precipitated metal cations they decompose or volatilize leaving behind metal oxides as reaction products. Selection of such precipitating anions is within the level of skill in the art.

As used herein a counter anion is an ion, such as nitrate, that does not form an insoluble salt with the metal cations in the starting solutions at the pH of either starting solution or at any pH between the pH of said solutions. For the practice of the invention disclosed herein it is preferable that said counter anions are decomposable or pyrolyzable so that when the precipitated metal cations and precipitating anions are calcined and sintered said counter anion decompose or volatilize, Selection of said counter anions is within the level of skill in the art.

As used herein the stoichiometric ratio is ratio of the concentrations of the constituent metal cations in the superconducting ceramic material produced by the method disclosed herein.

As used herein calcining is the process whereby the metal salts in the dried precipitate are oxidized and counter ions are pyrolyzed or decomposed. Calcining is generally conducted for relatively short times, preferably about 5 minutes, at temperatures between 800° to 900° C.

As used herein sintering is the process whereby the solid state reactions among the constituent metal oxides are effected and a ceramic material is formed. Sintering is generally conducted at temperatures between 800° to 900° C., preferably about 850° C., for at least about 10 hours, preferably 12 hours. In practicing the invention disclosed herein the precipitate produced as herein disclosed can be successively calcined and sintered to form the superconducting ceramic materials of this invention.

In the invention disclosed herein two aqueous solutions are prepared. A first aqueous solution that contains soluble metal cations, other than thallium cations, hydrogen peroxide, and pyrolyzable or decomposable counter ions is prepared. The selection of metal cations are those that are the constituents of the superconducting material that is being prepared and said selection is well within the level of skill in the art. Metal ions suitable for use in this solution are those that are components of superconducting materials and are soluble at lower pH, but that precipitate out of solution as, for example, hydroxides and carbonates at higher pH. It is well within the level of skill in the art to select metal ions having these properties. See, e.g., Bunker et al., supra. The selection of pyrolizable or decomposable counter ions is also well within the level of skill in the art. Nitrate salts of the metal cations are preferred. The concentrations of the metal ions are selected so that the salts thereof that are formed upon addition of the precipitating anions are insoluble at a selected pH and so that the ratio among the concentrations is the same as the desired stoichiometric ratios in the superconducting material that will be prepared therefrom. The concentration of hydrogen peroxide chosen is in excess, preferably about a 10-fold excess, of the concentration of thallium ions that will be present when this first solution is mixed with a second solution that contains said thallium ions. The pH is selected such that the metal cations are soluble and such that when a selected quantity of this solution is mixed with a second solution an intermediate and controlled pH is achieved. This pH is selected such that upon mixing of the two solutions, the final concentrations of the metal cations remaining in solution are at least three orders of magnitude less in than the starting solution. Again, it is well-within the level of skill in the art to select this pH. A second solution is prepared that contains a salt of thallium (I), wherein the counter ion of said salt is decomposable or pyrolizable at high temperature, and also contains decomposable or pyrolizable precipitating counter ions, such as hydroxide and carbonate. The precipitating counter ions are selected such that upon mixing the second solution with the first solution, insoluble salts of the metal ions in the first solution are formed. The concentration of thallium ions in the solution is selected in excess of the required stoichiometry desired in the superconductor composition. The pH of the second solution is higher than that of the first solution and the pH that is sufficient to precipitate the cations in the first solution. By mixing selected volumes constant selected ratios of the volumes of the two solutions the pH of the mixture is controlled and is constant.

The solutions are mixed so that the concentrations of the cations and other components of the solution are constant and the pH is controlled. Instantaneous mixing may be effected by any means by which a homogenous mixture is formed. If small volumes of less than about a liter are used instantaneous mixing can be effected by simultaneously pouring both solutions into a vessel from which the precipitate may be collected. If larger volumes are desired it is necessary to employ methods for mixing whereby constant proportions and concentrations the components of said solutions are mixed so that as homogeneous mixture and thereby homogenous precipitate containing the salts of the desired metal cations, including thallium, is produced. For example, the method for instantaneous mixing and the apparatus therefor that are described in Bunker, et al., supra., may be used. Developing other methods to effect instantaneous mixing is within the level of the skill in the art. Upon mixing, the thallium (I) ions from the second solution are oxidized to thallium (III) in the presence hydrogen peroxide, which is unstable in the mixture, from the first solution to yield insoluble salts thereof which precipitate along with the insoluble salts of the other metal cations to form a precipitate which consists of a homogeneous mixture of insoluble salts of the desired metal cations, including thallium.

The precipitate is collected and dried to form a powder, which can then be calcined at elevated temperatures for relatively short times, preferably less than about 5 minutes, pressed into a pellet and sintered to yield a homogeneous superconducting ceramic material that consists of oxides containing the selected constituent metal cations, including thallium, at the desired stoichiometric ratios. Methods for drying, pressing, calcining, and sintering are well-known and routine to those having skill in the art. Selection of the appropriate temperatures and times for calcining and sintering for producing a particular superconducting material requires only routine optimization and is well within the level of skill in the art.

In one typical procedure using the methods of this invention for the production of a superconducting ceramic material that contains thallium oxides a first solution is prepared by dissolving hydrogen peroxide and the nitrate salts of barium, calcium, and copper in water, wherein the ratios of the concentrations of the metal cations are equivalent to the stoichiometric ratios thereof desired in the superconducting material and the molar amount of hydrogen peroxide dissolved in this solution is about two-fold to three-fold greater than the molar amount of thallium (I) in a second solution such that upon mixing said first and second solutions substantially all of the thallium (I) is oxidized to thallium (III) and any excess hydrogen peroxide is converted to water and oxygen by virtue of its instability in said mixture. The pH of said first solution is less than the pH of said second solution and is selected so that upon mixing said first and second solutions the insoluble salts of the metal cations are formed. The second solution that contains the precipitating anions, hydroxide and carbonate, and thallium nitrate is prepared by dissolving an excess of $(CH_3)_4NOH \cdot 5H_2O$ in water, bubbling $CO_2$ gas into the solution, and monitoring the pH until it reaches a level that is less than the pH of the solution prior to the addition of said $CO_2$ gas and less than 14 and is such that upon mixing said second solution with said first solution the metal cation salts of the precipitating anions will be insoluble in the mixture. The thallium nitrated is added and dissolved after the pH has stabilized.

The solutions are instantaneously mixed so that thallium (I) is converted to thallium (III) and a homogeneous precipitate containing the carbonate and hydroxide of the metal cations, including thallium (III). The precipitate may be vacuum filtered and air dried to form a powder. The powder, which is then calcined for about 5 minutes at 850° C., may then be pressed into a pellet with about 5 Kbar of pressure, and sintered for about 12 hours at 850° to form a homogeneous superconducting ceramic having the desired stoichiometric ratios of thallium to calcium to barium to copper.

In one embodiment of this invention the dried powders had the composition $Tl_{2.74} \cdot Ca_{0.90pl} \cdot Ba_{0.89} \cdot Cu_{2.00}$ and the superconducting ceramic material produced therefrom had the formula $Tl_2CaBa_2Cu_2O_8$. Other superconducting phases that have been prepared using this approach include $TlCa_2Ba_2Cu_3O_x$, $Tl_2Ca_2Ba_2Cu_3O_x$, and $TlCaBa_2Cu_2O_x$.

The following examples are included for illustrative purposes only and are not intended to limit the scope of the invention.

EXAMPLE 1

Solution A, the first aqueous solution, was prepared by dissolving 0.025 moles of $Cu(NO_3)_2 \cdot 2.5H_2O$ (assay=99.7%; mol. wt.=235.59 g/mole; actual wt.=5.89 g.), 0.0125 moles of $Ca(NO_3)_2 \cdot 4H_2O$ (assay=99.0%; mol. wt.=236.16 g/mole; actual wt.=2.98 g), 0.0125 moles of $Ba(NO_3)_2$ (assay=95.0%; mol. wt.=261.34; actual wt.=3.26 g); and 30.42 ml. of 30% by wt. $H_2O_2$ (0.30 moles) in water to make 500 ml. of solution. The solution was filtered using 0.45 μm filter paper. The final solution concentrations were 0.050 moles/l. Cu, 0.025 moles/l. Ca, 0.025 moles/l Ba, and 0.60 moles/l of $H_2O_2$.

Solution B, the second aqueous solution, was prepared by dissolving 0.375 moles of $(CH_3)_4NOH \cdot 5H_2O$ (assay=99.0%; mol. wt. 181.23; actual weight 68.68 g.) in 500 ml. of water. Carbonate was formed by bubbling $CO_2$ gas into the solution and monitoring the pH. The initial pH of the solution was 13.90. After addition of $CO_2$, the pH was 13.60. Thallium was added by dissolving 0.06 moles of $TlNO_3$ (assay=100%; mol. wt. 266.37 g./mole: actual wt. 15.98 g.) into the solution. The final concentration of thallium was 0.12 moles/l.

Solutions A and B were quickly mixed Upon mixing a brown precipitate formed instantly. The precipitate was vacuum filtered and air dried. The dried powder was analyzed by inductively coupled plasma atomic emission spectroscopy (ICP-AES) and found to have a composition of $Tl_{2.74}Ca_{0.90}Ba_{0.89}Cu_{2.00}$.

The powder was calcined in air for 5 minutes at 850° C., uniaxially pressed into a pellet with 5 kbar of pressure, and sintered in 1 atm. $O_2$ at 850° C for 12 hours. The resulting superconducting ceramic exhibited zero resistance at 97° K. and a zero field critical current of 1570 A/cm².

EXAMPLE 2

Solution A, the first aqueous solution, was prepared by dissolving 0.012 moles of $Cu(NO_3)_2.2.5H_2O$ (assay=96.9%; mol. wt.=235.59 g/mole; actual wt.=2.82 g.), 0.0078 moles of $Ca(NO_3)_2.4H_2O$ (assay=96.5%; mol. wt.=236.16 g/mole; actual wt.=1.92 g), 0.0078 moles of $Ba(NO_3)_2$ (assay=95.6%; mol. wt.=261.34; actual wt.=2.14 g); and 38 ml. of 30% by wt. $H_2O_2$(0.38 moles) in water to make 250 ml. of solution. The solution was filtered using 0.45 μm filter paper. The final solution concentrations were 0.047 moles/l. Cu, 0.031 moles/l. Ca, 0.031 moles/l Ba, and 1.50 moles/l of $H_2O_2$.

Solution B, the second aqueous solution, was prepared by dissolving 0.188 moles of $(CH_3)_4NOH.5H_2O$ (assay=99.0%; mol. wt. 181.23; actual weight 34.32g.) in 250 ml. of water. Carbonate was formed by bubbling $CO_2$ gas into the solution and monitoring the pH. THe initial pH of the solution was 13.94. After addition of $CO_2$, the pH was 13.64. Thallium was added by dissolving 0.038 moles of $TlNO_3$ (assay=100%; mol. wt. 266.37 g./mole; actual wt. 10.01 g.) into the solution. The final concentration of thallium was 0.15 moles/l.

Solutions A and B were quickly mixed Upon mixing a brown precipitate formed instantly. The slurry was concentrated via vacuum filtering and rapidly frozen in liquid nitrogen. Upon thawing, the slurry was again vacuum filtered. The dewatered precipitate was allowed to air dry. The dried powder was analyzed by inductively coupled plasma atomic emission spectroscopy (ICP-AES) and found to have a composition of $Tl_{6.50}Ca_{2.01}Ba_{2.00}Cu_{3.06}$. The powder was calcined in flowing oxygen for 10 minutes at 850° C. and sintered in a closed system under vacuum at 850° C. for 12 hours. The resulting material was primarily the $Tl_2Ca_2Ba_2Cu_3O_{10}$ high temperature superconducting phase with an onset temperature of 125° K. as determined by magnetization.

Since modifications will be apparent to those of skill in the art, it is intended that this invention be limited only by the scope of the appended claims.

We claim:

1. A method for preparing Tl—Ba—Ca—Cu—O precursor powder which can be successively calcined and sintered to produce a superconducting ceramic material that comprises an oxide of thallium cations with oxides of the metal cations capable of yielding the superperconducting ceramic material at selected stoichiometric ratios of said metal cations, said method comprising:

(a) preparing a first aqueous solution containing said metal cations, pyrolyzable or decomposable counter anions, and hydrogen peroxide, wherein the ratios among the concentrations of said metal cations are the same as said selected stoichiometric ratios;

(b) preparing a second aqueous solution comprising thallium (I) cations, precipitating anions, and counter ions, wherein said thallium (I) cations are present at a concentration such that upon mixing a selected quantity of this second solution with a selected quantity of said first solution thallium metal cations will be present in the mixture at a concentration about 2 to 4 times greater than that which would be equivalent to the selected stoichiometric ratio of thallium in said ceramic;

(c) quickly mixing said selected quantities of said first and second solutions whereby said mixture is at a pH maintained at a level that is within the range of 9 to 11 at which the precipitating anion salts of all the metal cations of said first aqueous solution are insoluble in order to precipitate said salts and whereby thallium (I) is oxidized in the presence of hydrogen peroxide to thallium (III), which forms an insoluble salt with the precipitating anions, to yield a precipitate comprising salts of thallium and said metal cations at said stoichiometric proportions; and (d) collecting and drying said precipitate to yield a powder which consists of the desired cations, hydroxide and carbonate anions, and minor quantities of pyrolyzable or decomposable counter ions.

2. The method of claim 1 further comprising successively drying, calcining and sintering said precipitate to produce a superconducting ceramic.

3. A method for preparing a precursor powder which can be successively, calcined and sintered to form a superconducting ceramic material having the formula $Tl_aCa_bBa_cCu_dO_x$, wherein a,b,c, and d, are the desired stoichiometric ratios of each constituent metal in said superconducting ceramic material, and x is the stoichiometric ratio of oxygen, comprising:

(a) preparing a first aqueous solution containing calcium cations, barium cations, copper cations, pyrolyzable or decomposable counter anions, and hydrogen peroxide, wherein the ratio of the concentrations of calcium to barium is b to c, the ratio of the concentrations of barium to copper is c to d, and the amount of hydrogen peroxide is at least a five-fold excess, excess compared to the amount of thallium (I) cations in a second aqueous solution;

(b) preparing said second aqueous solution having the pH adjusted to pH value that is greater than the pH of said first solution, said second solution comprising thallium (I) cations, hydroxide and carbonate precipitating anions, and pyrolyzable or decomposable counter ions, wherein said thallium (I) cations are at a concentration such that, upon mixing a selected quantity of the second solution with a selected quantity of said first solution, thallium metal cations will be present in the mixture at a concentration such that the ratio of thallium to calcium is about 2.5-fold greater than that desired in the final ceramic product;

(c) quickly mixing said selected quantities of said solutions at a pH that is controlled at a pH selected from the group consisting of pH 9 to 11 to yield a precipitate comprising calcium, barium and copper ions at the desired stoichiometric ratio and thallium (III) cations at least 1.5-fold, greater than the desired stoichiometric ratio; and, (d) collecting and drying said precipitate to yield a powder which contains thallium, calcium, barium and copper cations, hydroxide and carbonate anions, and minor quantities of pyrolizable or decomposable counter ions.

4. The method of claim 3 wherein said pyrolizable precipitating anions in said second aqueous solution are hydroxide and carbonate and are produced by dissolving an excess of $(CH_3)_4NOH \cdot 5H_2O$ in said solution and bubbling carbon dioxide through said solution until the pH is adjusted to the desired value thereof.

5. The method of claim 3 wherein said mixing is effected by an apparatus comprising a first container containing said first solution, a second container containing said second solution, and a mixing chamber comprising means for effecting complete and instantaneous mixing of said first and second solutions.

6. The method of claim 3 further comprising successively calcining said powder at temperatures of about 800° C. to about 900° C. to produce a homogenous powder containing calcium, barium, and copper at the desired stoichiometric ratios and thallium at least a 1.5-fold, greater ratio than said desired stoichiometric ratio, and sintering said powder at about 800° C. to about 900° C. for a sufficient time to produce a homogenous and dense superconducting ceramic.

7. A method for producing homogenous finely grained Tl—Ba—Ca—Cu—O precursor powders for the production of highly dense superconducting ceramic materials that comprise an oxide of thallium with oxides of the metals capable of yielding said superconducting ceramic materials, said method comprising:

(a) preparing a first aqueous solution that comprises soluble salts of said metals and hydrogen peroxide, wherein the amount of said hydrogen peroxide is in a at least 5-fold excess compared to the amount of thallium (I) cations in a second solution;

(b) preparing said second solution, wherein said second solution comprises soluble salts of thallium (I) and decomposable or pyrolyzable counter anions and precipitating anions, wherein said thallium (I) cations are present at a concentration such that upon mixing a selected quantity of this second solution with a selected quantity of said first solution thallium metal cations will be present in the mixture at a concentration about 2 to 4 times greater than that which would be equivalent to the selected stoichiometric ratio of thallium in said ceramic;

(c) instantaneously mixing said first and second solution, whereupon said thallium (I) cations are oxidized to thallium (III) cations, which, along with said metal cations, precipitates out of solution as a salt of said precipitating anions; and (d) collecting and drying the precipitate to produce said precursor powder.

* * * * *